United States Patent [19]

Ayanoglu et al.

[11] Patent Number: 5,007,067
[45] Date of Patent: Apr. 9, 1991

[54] DIVERSITY CODING FOR TRANSPARENT SELF-HEALING COMMUNICATIONS NETWORKS

[75] Inventors: Ender Ayanoglu, Atlantic Highlands; Richard D. Gitlin, Little Silver; Chih-Lin I, Red Bank; James E. Mazo, Fair Haven, all of N.J.

[73] Assignee: AT&T Bell Laboratories, Murray Hill, N.J.

[21] Appl. No.: 414,874

[22] Filed: Sep. 29, 1989

[51] Int. Cl.$^5$ .................... H04B 07/02; H04L 01/02
[52] U.S. Cl. ...................................... 375/40; 371/68.2
[58] Field of Search ....................... 375/38, 39, 58, 40, 375/45; 371/43, 37.1, 37.4, 8.2, 8.1, 37.2, 48, 30, 681-683; 370/16; 379/220, 221; 455/8, 10; 340/825.01

[56] References Cited

U.S. PATENT DOCUMENTS

| | | | |
|---|---|---|---|
| 3,065,420 | 11/1962 | Close | 455/8 |
| 3,444,516 | 5/1969 | Lechleider | 375/40 X |
| 3,681,694 | 8/1972 | Sarati | 371/8.2 X |
| 3,878,463 | 4/1975 | Lanigan | 455/8 |
| 4,370,745 | 1/1983 | Miller | 375/40 X |
| 4,541,095 | 9/1985 | Vries | 371/37.1 |
| 4,601,046 | 7/1986 | Halpren et al. | 375/38 |
| 4,881,245 | 11/1989 | Walker et al. | 375/38 |

OTHER PUBLICATIONS

Daniel J. Castello, Jr. et al., "Error Control Coding", 1983, pp. 51-121.
Proceedings of the International Communications Conf., "Dispersity Routing", N. F. Maxemchuk, 1975, pp. 41.10-41.13.
IEEE Transactions on Computers, "The Discrete Fourier Transform Over Finite Rings with Application to Fast Convolution", vol. C-27, No. 7, Jul. 1978, pp. 586-593, E. Dubois et al.
IEEE Transactions on Computers, "Fault-Tolerance Asynchronous Networks Using Read-Only Memories", vol. C-27, No. 7, Jul. 1978, D. K. Pradhan, pp. 674-679.
IEEE Globecom, "Experimental Broadband Drop/Insert/Cross-Connect System: 1.8 Gbit/s Shuttle Bus", 1988, vol. 2, N. Fujimoto, et al., pp. 954-959.
Telephony's Transmission Special, "Before the Complaint Rolls In . . .", Oct. 1988, vol. 215, No. 15B, C. Wilson, pp. 43, 45, 47.

*Primary Examiner*—Benedict V. Safourek
*Assistant Examiner*—Tesfaldet Bocure

[57] ABSTRACT

This invention is a technique for the substantially instantaneous self-healing of digital communications networks. Digital data streams from each of N nearby sources are combined and encoded to produce N+M coded data streams using a coding algorithm. The N+M coded data streams are then each transmitted over a separate long haul communications link to a decoder where any N of the N+M coded data streams can be decoded uniquely to produce the original N data streams. The orginal N data streams are then distributed to their respective separate end destinations. If any M or less of the N+M long haul communications links fails, i.e. as in a telephone line that gets cut or a long distance switch that fails, no rerouting of traffic need be done. Rather, the receiver detects loss of carrier on the failed link(s), and immediately supplies the missing data by decoding the data from the at least N remaining links. The technique overcomes a long felt problem of trying to reroute traffic by using sophisticated resource allocation techniques when a communications link fails.

14 Claims, 1 Drawing Sheet

DIVERSITY CODING FOR TRANSPARENT SELF-HEALING COMMUNICATIONS NETWORKS

BACKGROUND OF THE INVENTION

The present invention relates to communications networks, and more particularly, to self-healing communications networks.

DESCRIPTION OF THE PRIOR ART

Self healing networks have been the subject of much research over many years. Most of this research has concentrated on trying to build networks which can quickly detect failed communications link(s) in the network and automatically reroute the traffic from these failed communications link(s) to alternate communications link(s). One such self-healing network is described in the article "Before the Complaint Rolls In ... " by C. Wilson in *Telephony*, Vol. 215, No. 15B, Oct. 1988 at pp. 43–47. This article describes the use of a ring network to compensate for possible failures. More particularly, traffic is routed through the network from one node to the next node along a continuous ring. If a link in the ring fails, traffic which needs to be routed across the failed link is routed around the ring in the opposite direction until reaching its destination node on the other side of the failed link. This introduces extra delay in the network and further congests the links which must be used to carry the traffic normally handled by the failed link. Most other work in self healing networks has also concentrated on rerouting traffic around failed links in one way or another, as is discussed in the above mentioned article. All of the previous methods however, introduce the delay necessary to inform the transmitter that a communications link has failed. Further, congestion problems on the remaining healthy lines are introduced in many of these networks, since they now must handle additional traffic due to the failed links. The problem that remains in the prior art is to provide a self healing network which (1) is fast, i.e. does not require time to inform the transmitting node to reroute traffic around a failed link, (2) does not congest the healthy communications links by requiring them to carry the traffic normally carried by the failed communications links, and (3) does not require an excessive amount of redundant links.

SUMMARY OF THE INVENTION

The foregoing problem in the prior art has been solved in accordance with the present invention which relates to a substantially instantaneous self healing network. In the inventive network, data streams from a plurality of N sources are encoded to produce N+M coded streams, which are each transmitted over a separate communications link. The coded streams are received by one or more receivers, and any N of the N+M coded streams can be uniquely decoded to produce the original N data streams, thereby providing protection against the simultaneous failure of up to M of the M+N communications links. In a more general embodiment, any network architecture is transformed into a logical point-to-point architecture to utilize the method, and distributed storage systems are also protected by the method.

DETAILED DESCRIPTION

Figure 1:
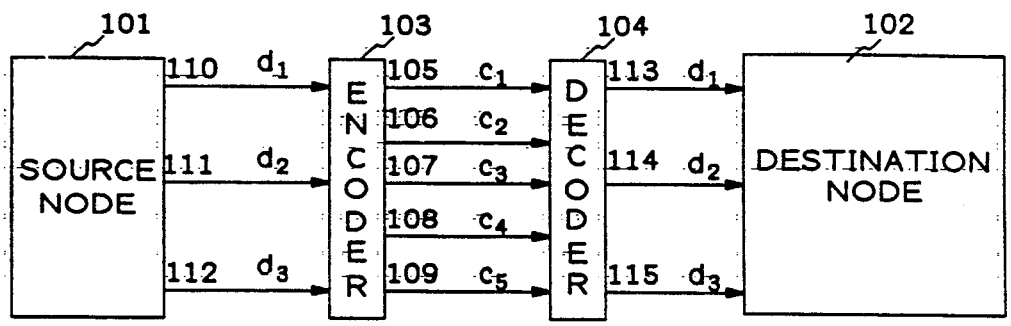
FIG. 1 shows a block diagram of an exemplary embodiment of the inventive network.

FIG. 1 shows an exemplary embodiment of the inventive network comprising (1) a source node 101 for generating a plurality of three exemplary digital data streams $d_1$, $d_2$ and $d_3$, and for transmitting each data stream over a separate one of lines 110–112, respectively, (2) an encoder 103 for concurrently receiving the three data streams $d_1$–$d_3$ from lines 110–112, and for generating therefrom an exemplary five coded streams $c_1$–$c_5$, (3) communications links 105–109, each for conveying a separate one of the five coded streams $c_1$–$c_5$ to a remote location, (4) decoder 104 for decoding the exemplary five coded streams $c_1$–$c_5$ at the remote location to regenerate the three data streams $d_1$–$d_3$, and (5) a destination node 102 for receiving the three data streams. For purposes of explanation, all data is assumed to flow from source node 101 to destination node 102, although in an actual system the data could flow in both directions between any two nodes, since the connections between the nodes could be full duplex. Further, it is to be understood that encoder 103 and source node 101 could be physically colocated as could decoder 104 and destination node 102.

In operation, the exemplary three digital data streams $d_1$–$d_3$, to be transmitted from source node 101 to destination node 102, are generated by one or more pieces of user equipment at source node 101. Encoder 103 encodes the data streams $d_1$–$d_3$ to generate therefrom five coded streams $c_1$–$c_5$, each to be transmitted over a separate one of communications links 105–109, respectively, to decoder 104. When the five coded streams $c_1$–$c_5$ are received at decoder 104, the three original data streams $d_1$–$d_3$ are reproduced from any three or more of the coded streams $c_1$–$c_5$ that arrive at the decoder. Each of the three data streams $d_1$–$d_3$ is then supplied over a separate one of lines 113 to 115 to destination node 102.

When all five communications links 105–109 are functioning properly, the decoder merely decodes, for example, coded streams $c_1$–$c_3$, to generate the original three data streams $d_1$–$d_3$, while discarding the remaining two data streams. Further, it will be assumed herein for purposes of explanation only and not limitation that the code is designed such that $c_1$, $c_2$, and $c_3$ are identical to $d_1$, $d_2$, and $d_3$, respectively. Therefore, when the network is functioning properly, i.e., none of the communications links 105–109 have failed, no decoding need be done at all, and decoder 104 simply supplies each of coded streams $c_1$, $c_2$, and $c_3$ to destination node 102 over a separate line 113, 114, and 115, respectively, while discarding the incoming coded streams $c_4$ and $c_5$.

When one of the communications links, say link 107 fails, decoder 104 detects loss of carrier, or some other parameter such as loss of synchronization, on link 107. Decoder 104 can immediately supply the lost coded stream $c_3$, and thus $d_3$, by decoding any three of the remaining four coded streams $c_1$, $c_2$, $c_4$, and $c_5$, where $c_1$ and $c_2$ are equal to $d_1$ and $d_2$, respectively, as described above. Recovery of $c_3$ then yields $d_3$ as when the communications links 105–109 were functioning properly. Further, even if two of communication links 105–107 fail, decoder 104 can recover the original three data streams by decoding the remaining three coded streams. In general, if N data streams, three in this example ($d_1$–$d_3$), are used to generate N+M coded streams, five in this example ($c_1$–$c_5$), then decoder 104 can recover the N data streams from any N of the remaining coded streams. This can be seen by examining an exemplary coding and decoding algorithm, described below.

Each of the three exemplary data streams can be subdivided into exemplary time slots, where each time slot may contain one or more data digits. If we consider one such time slot, a separate data symbol exists on each of lines 110–112. The operation of the encoder can be viewed as a matrix multiplication, C=GD, where D is an N symbol column vector comprised of the data symbols from lines 110, 111, and 112, G is a fixed (N+M)×N generator matrix which defines the code, and C is an N+M symbol column vector, each symbol in the N+M symbol column vector representing a separate coded symbol to be transmitted over a separate one of communications links 105–109. The matrix multiplication is shown below in equation 1, for the exemplary system of FIG. 1 comprising three data streams and five coded streams, $$\begin{bmatrix} c_1' \\ c_2' \\ c_3' \\ c_4' \\ c_5' \end{bmatrix} = \begin{bmatrix} g_{1,1} & g_{1,2} & g_{1,3} \\ g_{2,1} & g_{2,2} & g_{1,3} \\ g_{3,1} & g_{3,2} & g_{3,3} \\ g_{4,1} & g_{4,2} & g_{4,3} \\ g_{5,1} & g_{5,2} & g_{5,3} \end{bmatrix} \begin{bmatrix} d_1' \\ d_2' \\ d_3' \end{bmatrix} \quad (1)$$

$$C = G \quad D$$

where the prime (') represents a b-digit symbol appearing during an exemplary time slot in the corresponding data stream; i.e., $d_1'$ represents a b-digit symbol in the data stream $d_1$. Acceptable values of b will be discussed later herein. By manipulating the generator matrix to comprise a 3×3 identity matrix in the upper portion of the G matrix of equation 1, and a 2×3 (M×N in general) parity matrix, denoted P, as the bottom two rows of the G matrix, the first three coded symbols will equal the data symbols and the last two coded symbols will be parity symbols. This can easily be done using well-known theories in linear algebra, such as row interchanges, multiplications by scalars, and additions. It is to be understood that all the matrices discussed herein are equivalent to any matrices which can be derived from such matrices by simply taking linear combinations of one or more rows. Equation 2 shows a fixed generator matrix which can be utilized in the exemplary network of FIG. 1, which comprises an N×N identity matrix in the upper portion.

$$\begin{bmatrix} d_1' \\ d_2' \\ d_3' \\ p_1' \\ p_2' \end{bmatrix} = \begin{bmatrix} 1 & 0 & 0 \\ 0 & 1 & 0 \\ 0 & 0 & 1 \\ p_{1,1} & p_{1,2} & p_{1,3} \\ p_{2,1} & p_{2,2} & p_{2,3} \end{bmatrix} \begin{bmatrix} d_1' \\ d_2' \\ d_3' \end{bmatrix} \quad (2)$$

where in equation 2, $p_1'$ is a b-digit parity symbol appearing during the exemplary time slot in parity stream $p_1$. Using the matrix of equation (2), $c_1$, $c_2$, $c_3$, $c_4$ and $c_5$ of equation 1 are equal to $d_1$, $d_2$, $d_3$, $p_1$, and $p_2$, respectively. When the matrix multiplication of equation 2 is carried out, it can be seen that equation 2 actually represents five equations, shown in Table 1 below, the left side of each of the five equations being the coded symbol to be transmitted over a separate one of communications links 105–109 of FIG. 1.

TABLE 1

$d_1' = d_1' + 0d_2' + 0d_3'$ (transmitted over 105)
$d_2' = 0d_1' + d_2' + 0d_3'$ (transmitted over 106)
$d_3' = 0d_1' + 0d_2' + d_3'$ (transmitted over 107)
$p_1' = p_{1,1} d_1' + p_{1,2} d_2' + p_{1,3} d_3'$ (transmitted over 108)
$p_2' = p_{2,1} d_1' + p_{2,2} d_2' + p_{2,3} d_3'$ (transmitted over 109)

If any combination of two communications links 105–109 which includes at least one communications link from the set 105, 106, 107 carrying the data streams $d_1$, $d_2$, and $d_3$, respectively, fails, the missing symbols are recovered by solving a set of equations at the decoder. For example, suppose communications links 105 and 106 fail, depriving the destination node of data symbols $d_1'$ and $d_2'$. Decoder 104 is then left with three of the equations from table one, two of which are shown below and are utilized to solve for the missing data symbols:

$$p_1' = p_{1,1}(d_1') + p_{1,2}(d_2') + p_{1,3}d_3'$$

$$p_2' = p_{2,1}(d_1') + p_{2,2}(d_2') + p_{2,3}d_3'$$

where the parenthetical terms are unknown at the decoder. The coefficients of the unknown terms, $p_{1,1}$; $p_{1,2}$; $p_{2,1}$; and $p_{2,2}$ form a two by two submatrix of the fixed generator matrix G. Therefore, this two by two submatrix must be invertible for the above two equations to be solvable by the decoder. Further, if the 2×2 submatrix is guaranteed to be invertible, the decoder can utilize any well known method; i.e., gaussian elimination, substitution, matrix inversion, etc., to solve the above two equations and generate $d_1'$ and $d_2'$ for each successive time slot until the failed communications links 105 and 106 can be repaired. Suppose communications links 105 and 107 are damaged, rather than communications links 105 and 106 as discussed above. In this case, the decoder would solve the set of equations:

$$p_1' = p_{1,1}(d_1') + p_{1,2}d_2' + p_{1,3}(d_3')$$

$$p_2' = p_{2,1}(d_1') + p_{2,2}d_2' + p_{2,3}(d_3')$$

which again represents two equations in two unknowns. Note, however, that the 2×2 submatrix of G represented by the coefficients of the unknowns in this second example is a different 2×2 submatrix than that of the first example. This new submatrix must also be invertible for the method to work. If some of the failed links were carrying data streams, while others were carrying parity streams, then the remaining parity streams can be used to recover the failed links which were carrying data. In general, in order to recover data from up to M failed communication links, any combination of N rows of the G matrix must be linearly independent. Thus, generator matrix G must be chosen correctly to make the system work. Two methods of choosing an appropriate generator matrix G are detailed below. For purposes of explanation hereinafter, the bottom M rows of the G matrix, which form an M×N matrix, are denoted as the P matrix.

One proper G is constructed by assigning the values within the G matrix as follows:

$$g_{i+N,j} = r^{(i-1)(j-1)} \quad (3)$$

where r is a primitive element of an arbitrary finite field, a and b are integers, the finite field comprises $a^b$ elements, $1 \leq i \leq M$ and $1 \leq j \leq N$, and $g_{i+N,j}$ is the element in the i+Nth row, jth column of the G matrix. Note these values of i and j only generate M rows of N elements each, since the first N rows of the generator matrix are assumed to be an N×N identity matrix. In this exemplary embodiment, all addition and multiplication for encoding the data symbols as previously described, and all arithmetic in equation (3), must be done within the exemplary finite field. Further, to guarantee linear independence of any combination of N rows of G, b must be chosen such that $$b > \sum_{i=1}^{M-1}(M-i)(N-i) \quad (4)$$

In some instances it may turn out that every combination of N rows of G are linearly independent even with a smaller b, however, there is no known systematic method of determining when this is the case for a G matric chosen in this manner.

One finite field, in which a=2, has $2^b$ elements and is especially attractive for implementation in a digital computer. More particularly, if we divide each data stream into time slots which each comprise b bits, and we make each element of G b bits in length, the condition described above will be met. The G matrix for the exemplary network of FIG. 1, with b=3, a=2, primitive element r=(010), and primitive polynomial $Z^3+Z+1$ is shown below.

$$\begin{bmatrix} 1 & 0 & 0 \\ 0 & 1 & 0 \\ 0 & 0 & 1 \\ 1 & 1 & 1 \\ 1 & r & r^2 \end{bmatrix} \quad (5)$$

where $r^2 = 100$.

Another method of determining a proper G matrix is as follows. First, define the M×(M+N) matrix H' as $$H' = \begin{bmatrix} 1 & 1 & 1 & \ldots & 1 \\ 1 & r & r^2 & \ldots & r^{N+M-1} \\ 1 & r^2 & r^4 & \ldots & r^{2(N+M-1)} \\ \vdots & \vdots & \vdots & & \vdots \\ 1 & r^{M-1} & r^{(M-1)2} & \ldots & r^{(M-1)(N+M-1)} \end{bmatrix} \quad (6)$$

where r is a primitive element of a finite field as described above. Next, define two more matrices A and B, where the columns of A are equal to the rightmost M columns of H', and the columns of B are equal to the leftmost N columns of H'. The desired (M+N)×N matrix G is then formed from an N×N identity matrix followed by the M rows of the product $A^{-1}B$. By defining the G matrix using this method, every combination of N rows of the G matrix are guaranteed to be linearly independent provided:

$$b \geq \log(N+M+1)$$

where the base of the logarithm function is a. Note that the number of digits in each exemplary symbol, or equivalently, the length of a time slot, can be made smaller than with the previous G matrix described, provided M>3.

Figure 2:
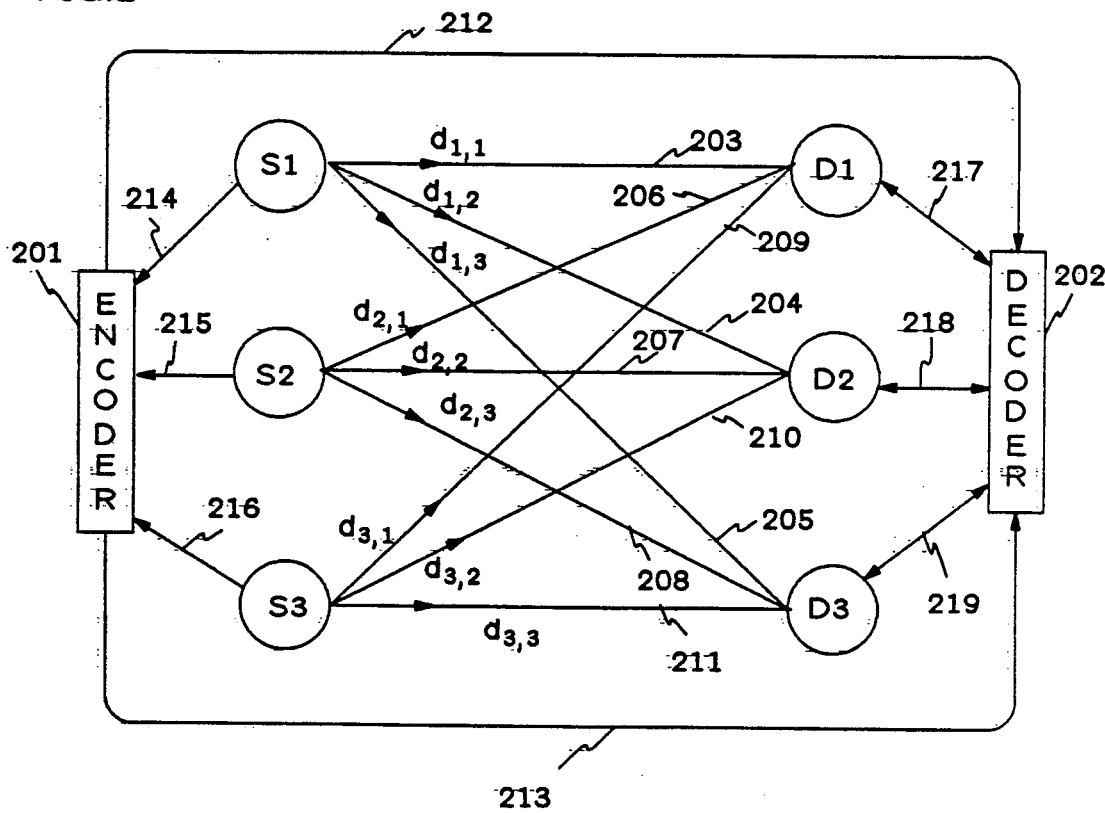
FIG. 2 shows a different embodiment of the inventive network utilizing a plurality of source and destination nodes.

The methods described above, with reference to FIG. 1, imply a plurality of communications links which connect a single source node to a single destination node. However, the method is more general and can be used to protect data on a plurality of communications links with a plurality of network nodes. FIG. 2 shows an exemplary embodiment of such a system comprising (1) source nodes S1–S3, (2) destination nodes D1–D3, (3) communications links 203–213, (4) encoder 201, (5) decoder 202, and (6) short distance communications links 214–219. Short distance communications links 214–219 can either be assumed reliable or protected using redundancy, error correction coding or any other well-known method. The short distance links can even be considered as any other link in the network and protected using the invention.

Each of the source nodes S1–S3 is arranged to transmit data to each of the destination nodes D1–D3 over a separate communications link. Each of communications links 203–211 is also labeled $d_{x,y}$, where x is a source node, y is a destination node, and $d_{x,y}$ represents the data stream to be transmitted from source node x to destination node y. Further, communications links 212 and 213 are each used to transmit a separate one of the M, two in this example, parity streams. Assuming the upper N×N matrix of G is the identity matrix, equation 7 shows a possible G matrix for use in this system, as well as vector D comprising a data symbol from each data stream during an exemplary time slot and the code vector C to be transmitted.

$$\begin{array}{c} d_{1,1}' \\ d_{1,2}' \\ d_{1,3}' \\ d_{2,1}' \\ d_{2,2}' \\ d_{2,3}' \\ d_{3,1}' \\ d_{3,2}' \\ d_{3,3}' \\ p_1' \\ p_2' \end{array} = \begin{bmatrix} 1 & 0 & 0 & 0 & 0 & 0 & 0 & 0 & 0 \\ 0 & 1 & 0 & 0 & 0 & 0 & 0 & 0 & 0 \\ 0 & 0 & 1 & 0 & 0 & 0 & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \\ p_{1,1} & p_{1,2} & p_{1,3} & p_{1,4} & p_{1,5} & p_{1,6} & p_{1,7} & p_{1,8} & p_{1,9} \\ p_{2,1} & p_{2,2} & p_{2,3} & p_{2,4} & p_{2,5} & p_{2,6} & p_{2,7} & p_{2,8} & p_{2,9} \end{bmatrix} \begin{array}{c} d_{1,1}' \\ d_{1,2}' \\ d_{1,3}' \\ d_{2,1}' \\ d_{2,2}' \\ d_{2,3}' \\ d_{3,1}' \\ d_{3,2}' \\ d_{3,3}' \end{array} \quad (7)$$

Equation 8 shows that each source node 203–211 can generate the portion of the 2 parity symbols $p_1'$ and $p_2'$ which depend on that source node's data. More particularly and with reference to both FIG. 2 and equation 7, consider an exemplary time slot for which we desire to calculate the parity $p_1'$ and $p_2'$. The following calculations are made at the source nodes S1–S3.

$$S1 =$$

$$d_{1,1}' \begin{bmatrix} p_{1,1} \\ p_{2,1} \end{bmatrix} + d_{1,2}' \begin{bmatrix} p_{1,2} \\ p_{2,2} \end{bmatrix} + d_{1,3}' \begin{bmatrix} p_{1,3} \\ p_{2,3} \end{bmatrix} = \text{Partial Matrix Product 1 (PM1)}$$

$$S2 =$$

$$d_{2,1}' \begin{bmatrix} p_{1,4} \\ p_{2,4} \end{bmatrix} + d_{2,2}' \begin{bmatrix} p_{1,5} \\ p_{2,5} \end{bmatrix} + d_{2,3}' \begin{bmatrix} p_{1,6} \\ p_{2,6} \end{bmatrix} = \text{Partial Matrix Product 2 (PM2)}$$

$$S3 =$$

$$d_{3,1}' \begin{bmatrix} p_{1,7} \\ p_{2,7} \end{bmatrix} + d_{3,2}' \begin{bmatrix} p_{1,8} \\ p_{2,8} \end{bmatrix} + d_{3,3}' \begin{bmatrix} p_{1,9} \\ p_{2,9} \end{bmatrix} = \text{Partial Matrix Product 3 (PM3)}$$

If each of the sources transmits its respective partial matrix product PM1, PM2, and PM3, to encoder 201, encoder 201 merely adds the three partial matrix products together to form a two element column vector. This two element column vector would comprise the two desired parity symbols. To see this, note from equation 8 that the second element of the column vector, for example, would be the sum $d_{1,1}' \cdot p_{2,1}' + d_{1,2}' p_{2,2}' + \ldots + d_{3,3}' p_{2,9}'$ which is equivalent to the last row of the G matrix multiplied by the vector D as equation 7 shows. Encoder 201 could even be installed in one of source nodes S1-S3, and the other source nodes would send their PM's to that source node. Each of the two parity symbols is then transmitted over a separate one of communications links 212-213.

Each of the destination nodes D1, D2, and D3, receive a separate three of the data streams $d_{1,1}$-$d_{3,3}$. The decoder 202 receives the parity streams $p_1$ and $p_2$, via communications links 212 and 213, respectively, as shown in FIG. 2. Decoder 202, also receives some partial decoding information from each of the destination nodes D1-D3, as detailed later herein. By utilizing this partial decoding information in combination with the parity streams $p_1$ and $p_2$, decoder 202 can recover data from any two of the communications links 203-211 which have failed, just as before, as described below.

First, in order to recover data from any two communications links 203-211 which have failed, the solution to two simultaneous, linearly independent equations is required, as in the point-to-point case described previously herein. For the exemplary system of FIG. 2, the two equations which must be solved are shown below, and represents the last two rows of the G matrix multiplied by the data vector D, as equation 7 shows.

$$p_{1,1}d_{1,1}' + p_{1,2}d_{1,2}' + p_{1,3}d_{1,3}' + p_{1,4}d_{2,1}' + p_{1,5}d_{2,2}' + p_{1,6}d_{2,3}' + p_{1,7}d_{3,1}' + p_{1,8}d_{3,2}' + p_{1,9}d_{3,3}' = p_1'$$

$$p_{2,1}d_{1,1}' + p_{2,2}d_{1,2}' + p_{2,3}d_{1,3}' + p_{2,4}d_{2,1}' + p_{2,5}d_{2,2}' + p_{2,6}d_{2,3}' + p_{2,7}d_{3,1}' + p_{2,8}d_{3,2}' + p_{2,9}d_{3,3}' = p_2'$$

The unknowns in the above equations will be determined by which of the communications links 203-211 have failed. For example, if communications links 203 and 204 fail, then $d_{1,1}$ and $d_{1,2}$ in the above equations are unknowns.

The decoding and recovery of lost data streams can be implemented as partial matrix products. More particularly, during normal operation, i.e. when no links have failed, each of destination nodes D1-D3 receives a separate data stream from source nodes S1-S3, and calculates all the terms from the above equations which are based on its respective received data. For example, destination node D1 calculates the sum $p_{1,1}d_{1,1}' + p_{1,4}d_{2,1}' + p_{1,7}d_{3,1}'$ which, as shown in the above equations, is destination node D1's contribution to $p_1'$. Further, destination node D1 computes, for each b bit symbol in its received data streams, $p_{2,1}d_{1,1}' + p_{2,4}d_{2,1}' + p_{2,7}d_{3,1}'$ which, as is shown above, is D1's contribution to $p_2'$. These partial matrix products, formed at the receiver are denoted herein as destination partial matrices (DPM). The other two exemplary destination nodes D2 and D3 would perform an analogus summation for their respective received data streams. Each of the sums is transmitted from its respective destination node D1-D3 to decoder 202. Further, in normal operation, decoder 202 merely discards everything it receives, after a short delay period as discussed below. When one or two of communications links 203-211 fail, the affected destination nodes D1-D3 notify decoder 202. The corresponding terms from the above equations vanish due to the failed communications links, leaving two equations with at most two unknowns. The equations are then solved by the decoder is previously described, and the missing symbols are transmitted to their respective destination nodes D1-D3.

Two implementation details are worth noting. first, decoder 202 must store a few successive time slots of data from each data and parity stream. This is because from the time one or more of communications links 203-211 fail, until the time the destination nodes D1-D3 can notify decoder 202 and cause decoder 202 to begin supplying the missing data symbols, several, say T, time slots may pass. Decoder 202 must have the data and parity symbols from each of those time slots to ensure that the data can be recovered. Second, since there may be different transmission delays over each of communications links 203-213, and short distance communications links 214-219, the decoder and encoder must realize that data symbols received from different ones of short distance communications links 214-219 and communications links 203-213 at different times may actually be from the same time slot. More particularly, either the encoder or the source nodes must equalize the difference in transmission delays over short distance communications links 214-219, either the destination nodes or the source nodes must equalize the different path delays of communications links 203-211, either the decoder or the encoder must equalize the different path delays of communications links 212-213, and either the destination nodes or the decoder must equalize the different path delays encountered over short distance communications links 217-219. This is easily accomplished through the use of buffers to delay the packets which need to be transmitted over paths with relatively short delays.

The method can be made even more general to accommodate networks of any arbitrary topology, where each node is arranged to transmit to, and to receive from, every other node in the network. First, assuming (1) each node has incoming and outgoing links, and (2) a central processor is employed to do all the encoding and decoding for the network, where each node in the network is equipped with 3M extra connections and each connection provides communications between the node and the central processor. Each of the first M connections to each note is used to send a separate element of the PM for that node to the central processor. Each of the second M connections is used to send a separate element of the DPM for that node from the central processor to that node. Finally, each of the last M connections is used to send a separate one of the M recovered data streams which have been lost due to network failure from the central processor to the node.

The method can be used to protect trunked communications lines also. More particularly, assume it is desired to protect up to M failed trunks in an N trunk system by installing an extra M trunks. Further assume that each of the N trunks and each of the additional M trunks comprises K communications links. If up to M of the trunks are destroyed, the data streams from the first communications link on each of the destroyed trunks is recovered using the data and parity streams on the first communications link of the N or more remaining trunks. The data stream from the second communications link on each of the destroyed trunks is recovered using the data and parity streams on the second communications link of the N or more remaining trunks. Similarly, the data streams from the third through Kth communications links of the destroyed trunks are recovered using the data and parity streams from the third through Kth links on the N or more remaining trunks. This can be done using the methods previously described herein.

It is to be understood that the examples given herein are for illustrative purposes only and that many different embodiments of the invention are possible without violating the spirit or scope of the invention. The communications links can be separated in frequency rather than in spaced, as in for example, a fiber optic Wavelength Division Multiplexed (WDM) system. The methods can be used to protect continuous amplitude-discrete time signals, by substituting any number proportional to $$-j\frac{2\pi}{N'}$$

where N' is any prime number greater than or equal to N in (3) or any integer N' greater than or equal to N+M in (6) and j represents the square root of −1, for r in all of the above described matrices and performing the arithmetic over the field of complex numbers, rather than an arbitrary finite field. This is due to the fact that $$-j\frac{2\pi}{N'}$$

can be viewed as a primitive root of a field of complex numbers. The encoder can be implemented in parallel by dividing a high speed data stream into several lower speed data streams, encoding each low speed data stream, and then multiplexing the code streams to form a high speed coded stream. At the decoder, the high speed coded stream is demultiplexed to form a plurality of lower speed coded streams, which are then decoded using the methods previously described. The 3M connections in the arbitrary topology could be reduced by multiplexing several signals onto a common link between a node and the central processor. The network links could be replaced with data storage devices, and the method applied to recover the data from any M failed storage devices, as in a distributed storage system. The source nodes and destination nodes could all be collocated, as in, for example, a switch, where failures between the inputs to the switch and the outputs from the switch could be protected using the method.

We claim:

1. In a communications system comprising a plurality of N independent data streams and a plurality of N+M communications links, a method of providing protection against the failure of up to M of the N+M communications links, M>1, comprising the steps of:
   (a) encoding the N independent data streams to generate N+M separate coded streams, any N of which may be used to decode the N independent data streams; said step of encoding including the step of generating a matrix product GD where D is a vector comprising N digital data symbols, one digital data symbol from each of the data streams, and G is a matrix comprising M+N rows, each row comprising N digital elements;
   (b) transmitting each of the N+M coded streams over a separate one of the N+M communications links.

2. The method according to claim 1 wherein the generator matrix G is arranged such that any combination of N rows are linearly independent.

3. The method according to claim 2 wherein the matrix G is equivalent to an N×N identity matrix concatenated with an M×N parity matrix.

4. The method according to claim 3 wherein the M×N parity matrix comprises M rows, each row comprising N elements, and wherein each element is assigned a separate value $r^{(i-1)(j-1)}$, where $1 \leq i \leq M$, i is one of M row numbers, $1 \leq j \leq N$, j is one of N column numbers, and r is a primitive root of a finite field, or proportional to a root of unity in a field of complex numbers.

5. The method according to claim 3 wherein the M×N parity matrix is equivalent to a matrix formed from a product $A^{-1}B$, wherein A comprises M rows, each row comprising M elements, and wherein each element is assigned a separate value $r^{(i-1)(j-1)}$, where $1 \leq i \leq M$, i is one of M row numbers, $N+1 \leq j \leq N+M$, j is one of M column numbers, and r is a primitive root of a finite field, or proportional to a root of unity in a field of complex numbers, and wherein B comprises M rows, each row comprising N elements, and wherein each element is assigned a separate value $r^{(i-1)(j-1)}$ where $1 \leq i \leq M$, i is one of M row numbers, $1 \leq j \leq N$, j is one of N column numbers, and r is a primitive root of a finite field, or proportional to a root of unity in a field of complex numbers.

6. The method according to claim 1, 2, 3, 4, or 5 wherein the plurality of N data streams are produced from a plurality of sources, and wherein said step (a) comprises the step of partially encoding the N independent data streams at each of the plurality of N or fewer sources.

7. The method according to claim 1, 2, 3, 4, or 5 wherein the plurality of N data streams are received at a plurality of destinations, and wherein said step (d) comprises the step of partially decoding the N independent data streams at each of the plurality of N or fewer destinations.

8. A communications system for conveying N data streams of interest, said communications system comprising:
   means for encoding the N data streams of interest to generate N+M coded streams, where M>1 and where any N of the N+M coded streams may be used to decode the N data streams of interest; said means for encoding comprising
   means for generating a matrix product GD where D comprises N digital data symbols, one digital data symbol from each of the data streams, and the matrix G comprises M+N rows, each row comprising N digital elements;
   N+M communications links, each communications link being disposed for conveying a separate one of the coded streams.

9. The communication system according to claim 8 wherein the G matrix is arranged such that any combination of N rows are linearly independent.

10. The communications system according to claim 9 wherein the matrix G is equivalent to an N×N identity matrix concatenated with an M×N parity matrix.

11. The communications system according to claim 10 wherein the M×N parity matrix comprises M rows, each row comprising N elements, and wherein each element is assigned a separate value $r^{(i-1)(j-1)}$, where $1 \leq i \leq M$, where i is one of M row numbers, $1 \leq j \leq M+N$, j is one of M+N column numbers, and r is a primitive root of a finite field or proportional to a root of unity in a field of complex numbers.

12. The communications system according to claim 10 wherein the M×N parity matrix is equivalent to a matrix formed from a product $A^{-1}B$, wherein A comprises M rows, each row comprising M elements, and wherein each element is assigned a separate value $r^{(i-1)(j-1)}$, where $1 \leq i \leq M$, i is one of M row numbers, $N+1 \leq j \leq N+M$, j is one of M column numbers, and r is a primitive root of a finite field, or proportional to a root of unity in a field of complex numbers, and wherein B comprises M rows, each row comprising N elements, and wherein each element is assigned a separate value $r^{(i-1)(j-1)}$ where $1 \leq i \leq M$, i is one of M row numbers, $1 \leq j \leq N$, j is one of N column numbers, and r is a primitive root of a finite field, or proportional to a rood of unity in a field of complex numbers.

13. The communications system according to claim 8, 9, 10, 11, or 12 wherein the plurality of N independent data streams are produced from a plurality of sources, and wherein said means for encoding comprises means for partially encoding the N independent data streams at each of the plurality of N or fewer sources.

14. The communications system according to claim 8, 9, 10, 11, or 12 wherein the plurality of N independent data streams are received at a plurality of destinations, and wherein said means for receiving and for recovering comprises means for partially decoding the N independent data streams at each of the plurality of N or fewer destinations.

* * * * *